United States Patent
Barkauskas et al.

(10) Patent No.: US 11,276,985 B2
(45) Date of Patent: Mar. 15, 2022

(54) DEVICE AND METHOD FOR GENERATION OF HIGH REPETITION RATE LASER PULSE BURSTS

(71) Applicant: UAB Light Conversion, Vilnius (LT)

(72) Inventors: Martynas Barkauskas, Vilnius (LT); Karolis Neimontas, Vilnius (LT); Vytautas Butkus, Vilnius (LT)

(73) Assignee: UAB Light Conversion, Vilnius (LT)

( * ) Notice: Subject to any disclaimer, the term of this patent is extended or adjusted under 35 U.S.C. 154(b) by 234 days.

(21) Appl. No.: 16/611,994

(22) PCT Filed: Apr. 19, 2018

(86) PCT No.: PCT/IB2018/052703
§ 371 (c)(1),
(2) Date: Nov. 8, 2019

(87) PCT Pub. No.: WO2018/207042
PCT Pub. Date: Nov. 15, 2018

(65) Prior Publication Data
US 2020/0067260 A1    Feb. 27, 2020

(30) Foreign Application Priority Data

May 8, 2017 (GB) ..................................... 1707334

(51) Int. Cl.
*H01S 3/00*      (2006.01)
*H01S 3/23*      (2006.01)
(Continued)

(52) U.S. Cl.
CPC .......... *H01S 3/235* (2013.01); *H01S 3/10046* (2013.01); *H01S 3/10061* (2013.01); *H01S 3/1075* (2013.01)

(58) Field of Classification Search
None
See application file for complete search history.

(56) References Cited

U.S. PATENT DOCUMENTS

| | | | |
|---|---|---|---|
| 4,896,119 A | * | 1/1990 | Williamson ............ H01S 3/235 359/348 |
| 5,790,303 A | | 8/1998 | Weston et al. |

(Continued)

FOREIGN PATENT DOCUMENTS

| | | |
|---|---|---|
| EP | 1617530 A2 | 1/2006 |
| EP | 2250714 B1 | 1/2015 |

(Continued)

OTHER PUBLICATIONS

Qian et al. "Pulsetrain-burst mode, ultrafast-laser interactions with 3D viable cell cultures as a model for soft biological tissues", Biomedical Optics Express, 2014, vol. 5, No. 1, pp. 208-222.

(Continued)

*Primary Examiner* — Mark Hellner
(74) *Attorney, Agent, or Firm* — AAA Law

(57) ABSTRACT

A method and a device for generating a series of laser pulses in a laser device, particularly single and multiple bursts of pulses with a minimum temporal distance between the pulses in a single burst in the picosecond domain. The device includes at least a master oscillator and a regenerative amplifier. The method includes steps of injecting a laser pulse from the master oscillator into the regenerative amplifier, amplifying injected pulse burst during multiple round-trips in an optical cavity of the regenerative amplifier, ejecting amplified pulse burst from the cavity of the regenerative amplifier. The injection step involves applying a first intermediate voltage to an optical switch for a time span, during which pulses from the oscillator are injected into the amplifier, forming a burst of injected seed pulses, which are further amplified in the amplification step, in which the optical switch voltage is set to a locking voltage.

19 Claims, 6 Drawing Sheets

Figure 2A:
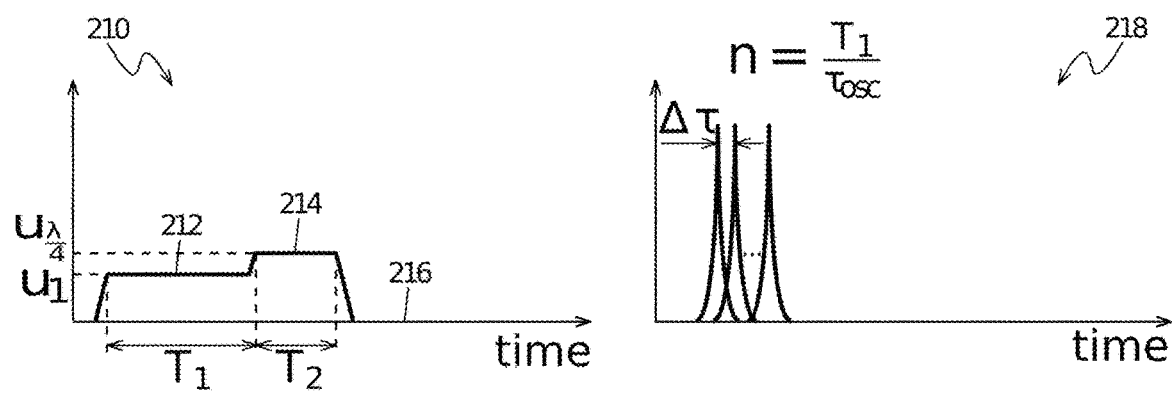

(51) Int. Cl.
*H01S 3/10* (2006.01)
*H01S 3/107* (2006.01)

(56) References Cited

U.S. PATENT DOCUMENTS

| | | |
|---|---|---|
| 6,552,301 B2 | 4/2003 | Herman et al. |
| 6,882,469 B2 | 4/2005 | Tamaki et al. |
| 7,016,107 B2 | 3/2006 | Kafka et al. |
| 7,386,019 B2 | 6/2008 | Klimov et al. |
| 7,649,667 B2 | 1/2010 | Bergmann et al. |
| 7,970,026 B2 | 6/2011 | Grishin et al. |
| 9,246,303 B1 | 1/2016 | Rockwell et al. |
| 9,306,370 B2 | 4/2016 | Danielius |
| 9,461,436 B2 | 10/2016 | Noh et al. |
| 9,525,264 B2 * | 12/2016 | Courjaud ............ H01S 3/10023 |
| 9,531,151 B2 | 12/2016 | Fuchs et al. |
| 2006/0018349 A1 | 1/2006 | Kopf et al. |
| 2011/0182306 A1 | 7/2011 | Hosseini et al. |
| 2016/0126693 A1 * | 5/2016 | Fuchs .................... H01S 3/107 |
| | | 372/25 |

FOREIGN PATENT DOCUMENTS

| | | |
|---|---|---|
| EP | 3018774 A1 | 5/2016 |
| JP | H08-255941 A | 10/1996 |

OTHER PUBLICATIONS

International Search Report and Written Opinion, dated Jul. 24, 2018, from corresponding PCT application No. PCT/IB2018/052703.

* cited by examiner

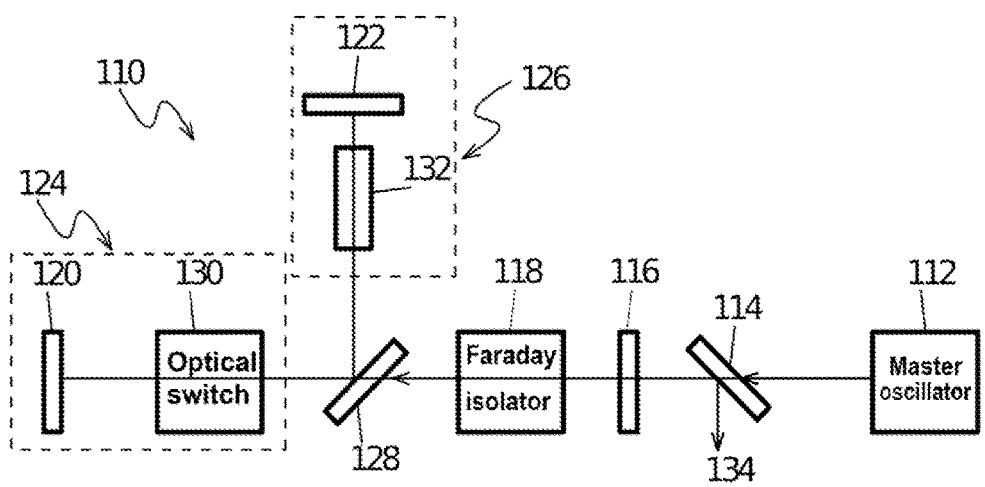
Figure 1a
Prior art
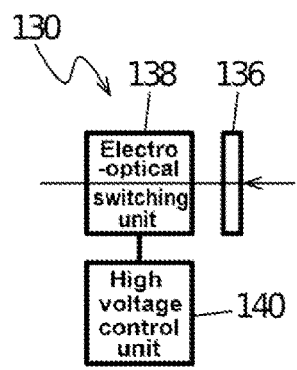 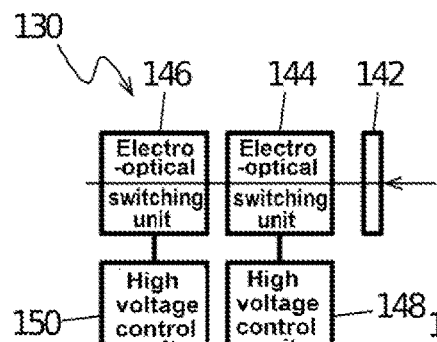 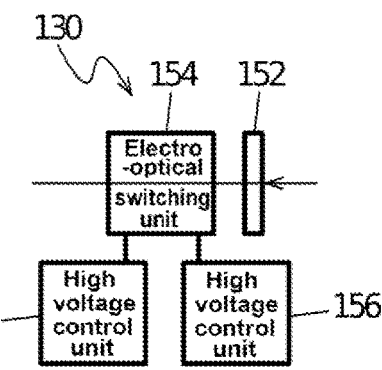
Figure 1b    Figure 1c    Figure 1d

DEVICE AND METHOD FOR GENERATION OF HIGH REPETITION RATE LASER PULSE BURSTS

FIELD OF INVENTION

This application relates to a method for generating a sequence of laser pulses, in particular of a series of bursts of laser pulses, by use of an electro-optic control in a laser system, comprising master oscillator and regenerative amplifier.

BACKGROUND ART

Utilization of lasers has become essential in many areas of micromachining in industry, science and medicine. Various techniques employing laser-produced light in wide range of applications are under intensive development. Advantages of laser-assisted welding, cutting, marking, etc. over regular mechanical techniques include but are not limited to high speed and precision, allowing for simple or none post-processing of material.

In any of the mentioned and related laser-assisted techniques, the desired mechanical changes are results of related physical phenomena occuring right after deposition of light energy to material. During this ablation process, solid phase material is transformed into a gas phase and is evaporated. Current state-of-art laser systems offer different approaches of laser light production and delivery, having their own advantages and shortcomings, well known for those skilled in art.

One of the most common problems laser-assisted micromachining technologies face, is related to heating of the pulse-affected zone, which might cause collateral damage. Utilization of femtosecond laser pulses instead of picosecond or longer, offer precise removal of material with reduced damaging effects caused by local heating.

High power of output laser radiation is desirable for faster material processing. However, technologies employing high-power lasers suffer from shielding effects. They are caused by the invoked plasma at the material surface, which leads to attenuation of subsequent light pulses due to defocusing, reflection, scattering, etc. Similarly, nonlinear effects become important for high-energy interactions. In such situations, ablation rate is severely reduced. High-repetition-rate technologies are advantageous both due to increased processing rate and diminished thermal effects.

Material processing by bursts of laser pulses is a ralatively new approach (see, for example U.S. Pat. No. 6,552,301 (Herman et al. 2003)). A burst of laser pulses is also referred to as a finite-length pulse train, multibunch or macropulse. In general terms, laser pulse burst is defined as two or more laser pulses, being equally temporally separated. Time interval between successive pulses is referred to as the in-burst pulse separation and measure, reciprocal to the in-burst pulse separation, is referred to as the in-burst frequency.

From here on we refer to operation where pulses in bursts are separated by time from 1 μs to 1 ms as the kilohertz (kHz) bursts, from 1 ns to 1 μs as the megahertz (MHz) bursts and from 1 ps to 1 ns as the gigahertz (GHz) bursts.

A laser system might be operating in a continuous burst mode, when pulse bursts are produced repeatedly with said burst frequency, reciprocal to time separation between beginnings of two adjacent bursts and being smaller than the in-burst frequency.

A laser system might be operating in an on-demand burst mode, when pulse bursts are fired at an arbitrary time, manually triggered by the end user or electronics driver.

When characterizing different burst modes and their performance in material processing, individual pulse length, the in-burst frequency and burst frequency must be taken into consideration.

A thorough discussion, how ablation rate can be increased by orders of magnitude and thermal effects diminished in laser burst mode can be found, for example, in a study by Kerse et al. (Kerse, et al. 2016). Very promising results were obtained by replacing a single high-energy laser pulse by a GHz burst of lower-energy pulses, while maintaining the same average power of fiber laser radiation. Lower-energy pulses do not invoke shielding effects, but being closely separated in time, allows for removal of locally heated material prior to thermal diffusion occurs.

Laser welding with megahertz bursts of low-intensity femtosecond pulses was demonstrated by Zimmermann et al. to achieve bonded glass breaking stress as high as 96% of the uncut glass (Zimmermann, et al. 2013). In megahertz burst mode of high-intensity femtosecond pulses, deeper holes in the BK7 glass were produced in comparison to a single-pulse mode (Rezaei, Li and Herman 2015). Laser system, operating in kHz or MHz burst mode of picosecond pulses, was shown to perform ablation of copper significantly faster compared to single pulses at the same fluence (Hu, Shin and King 2010). The results were confirmed by simulations, showing that for high in-burst frequency, the accumulated energy not dissipating in between the pulses is crucial for the fast operation. Similar result regarding copper ablation were reported by Neuenschwander et al., although no increase of steel removal rate in the same regime was observed (Neuenschwander, et al. 2015).

Zhang et al. have demonstrated, that utilization of laser pulse bursts could also be advantageous in fabrication of Bragg grating waveguides (Zhang, Eaton and Herman 2007).

MHz bursts of femtosecond pulses were demonstrated to yield more efficient formation of filamenting damage in sodalime glass in loose-focusing conditions (Deladurantaye, et al. 2011).

Biological tissue treatment with laser pulses in burst mode is advantageous due to possible minimization of heat transfer to the adjacent soft tissue and avoidance of collateral damage (Forrester, et al. 2006). It was also shown, that under laser treatment cell necrosis depends on pulse intensity, not burst length, thus allowing for more safe treatment (Qian, et al. 2014).

Current state of art laser systems, comprising a master oscillator and a regenerative amplifier and producing bursts of high-intensity laser pulses, utilize several technologies.

In some instances of the prior-art, bursts of laser pulses are generated before amplification and then used as seed pulses of an amplifier. Apparatus and driving method of the amplifier does not need to be special anyhow and might be well known from the prior-art (see, for example, U.S. Pat. No. 7,649,667 (Bergmann et al. 2010), U.S. Pat. No. 9,306,370 (Danielius 2016), U.S. Pat. No. 7,016,107 (Kafka et al. 2004) or U.S. Pat. No. 6,882,469 (Tamaki et al. 2005)).

For example, U.S. Pat. No. 9,246,303 (Rockwell et al. 2016) discloses a method and apparatus for switching of optical pulses, provided by the master oscillator, generating bursts in a preamp gain medium and providing such a shaped seed signal to a power amplifier; U.S. Pat. No. 9,431,436 (Noh et al. 2016) discloses an apparatus and method of generation of unamplified bursts of laser pulses by combining radiation of pulsed and continuous laser sources, subsequent selective amplification and frequency conversion by nonlinear element. One of ordinary skill in the art would recognize, that according to these and similar methods, the in-burst frequency is fixed and is equal to the repetition rate of pulses, provided by the solid-state master oscillator, i.e. in the order of a few tens of megahertzs.

U.S. Pat. No. 8,798,107 (Deladurantaye et al. 2004) discloses device and method of generating picosecond seed burst pulses by imposing a periodic phase modulation and performing pulse selection by a pulse picker. In a given embodiment, maximum in-burst frequency is in MHz range.

In some instances of the prior-art, bursts of laser pulses are generated in a separate apparatus, said burst generator, after pulse amplification, where pulse generation and amplification is done by any kind of laser system, known from the prior-art.

For example, patent EP2250714 (Hosseini et al. 2015) discloses apparatus and method of laser burst generation from amplified and stretched pulses. In the given embodiments, burst frequency is fixed and equal to the repetition rate of pulses, provided by the laser system itself and the in-burst frequency is fixed and equal to the reciprocal optical cycle within the disclosed apparatus (tens of nanoseconds, i.e. a megahertz burst mode).

Patent application U.S. Pat. No. 9,525,264 (Courjaud 2016) discloses a method and a system of laser burst generation, where more than one pulse from the master oscillator is trapped within a multi-passage regenerative amplifier. After amplification, burst of pulses, the number of which is related to the optical path of the amplifier, is released and the in-burst frequency is fixed and equal to the repetition rate of pulses, provided by the master oscillator.

In some instances of the prior-art, bursts of laser pulses are generated by injecting a single seed pulse from the master oscillator to an amplifier, which then undergoes amplification in gain medium. After some time, the pulse is partly exctracted from the amplifier; the remaining part is further amplified and repeatedly partly extracted, for example, at the next round-trip. In such a way, burst of amplified laser pulses is generated.

Injection, trapping and ejection of a pulse inside the amplifier can be done by controlling pulse polarization within the amplifier cavity and performing switching according to it. For this reason, at least one polarization-switching device, for example a Pockels cell, is placed within optical path of beam in the cavity and its driving voltage is varied in time (e.g. U.S. Pat. No. 7,649,667 (Bergmann et al. 2010), U.S. Pat. No. 9,306,370 (Danielius 2016), U.S. Pat. No. 6,882,469 (Tamaki et al. 2005)).

U.S. Pat. No. 9,531,151 (Fuchs et al. 2016) discloses a method of switching a single Pockels cell inside the cavity of a regenerative amplifier in such a way, that a single pulse from the master oscillator, trapped within the cavity of the regenerative amplifier for a multi-pass amplification, is further ejected by applying a specific sequence of voltage change to the Pockels cell. This method allows for generation of a laser burst, the frequency of which is tunable by the Pockels cell driver voltage and the in-burst frequency is fixed and equal to the reciprocal time duration of one pulse cycle within the regenerative amplifier cavity (from 10 ns to 200 ns, i.e. in megahertz range).

In all known laser burst generation devices and methods, comprising master oscillator and regenerative amplifier, known from the prior-art, the highest in-burst frequency is related to the frequency of pulse generation in the master oscillator or pulse round-trip time in the regenerative amplifier. Since the master oscillators operate in frequencies of tens of MHz and the round-cycle time of pulses in the regenerative amplifier is longer than 10 ns, none of laser burst generation devices and methods, comprising master oscillator and regenerative amplifier, known from the prior-art, allow for generation of laser bursts with in-burst frequency higher than a few hundreds of MHz.

SUMMARY

The present invention has been achieved in consideration of the above situation, and has the object of offering a method for generation of laser pulse bursts of an arbitrary in-burst frequency in GHz and THz range.

In order to accomplish the object, the laser system comprises a master oscillator and a regenerative amplifier, the pulse generation period of former and laser pulse round-trip time in later satisfy certain relational conditions. Regenerative optical amplifier according to this embodiment, comprises a resonator for amplifying injected light with electro-optic switching system, comprising at least one Pockels cell; method of operation of electro-optic system enables injection, locking/amplification and ejection of laser pulses through process, consisting of at least three stages, corresponding to injection of a few laser pulses into the regenerative amplifier, their locking and amplification during circulation within the regenerative amplifier, and their partial ejection as laser bursts.

Seed pulses are generated by the master oscillator, providing pulses, separated in time by period $\tau_{osc}$, which is at least in order of a few to a few tens of nanoseconds. The polarization state of the seed pulses is such, that pulses are completely transmitted through polarization-selective optical elements before the regenerative amplifier and are injected into the cavity of the regenerative amplifier. Time of circulation of a laser pulse inside the regenerative amplifier cavity—round-trip time $\tau_{RA}$—is related to its optical path and is usually in order of a few to a few tens of nanoseconds. In the present embodiment, $\tau_{osc}$ and $\tau_{RA}$ might be adjustable by mechanically shortening or elongating the optical path within the regenerative amplifier and/or oscillator.

Pulse injection is achieved by setting electro-optic system of the regenerative amplifier to some intermediate state (intermediate voltage), which causes seed laser pulses from the master oscillator to be partially transmitted to the cavity of the regenerative amplifier. And for pulses already injected in the cavity of the regenerative amplifier, they are partially reflected back to the cavity and partially ejected by transmission through the polarization-selective optical elements. As a result, during this stage, only a part of seed pulse energy is left for circulation within the regenerative amplifier, while the rest part is rudimentary and is ejected from the regenerative amplifier.

At the same time, seed pulses are continuously injected into the regenerative amplifier. Depending on the round-trip time in the regenerative amplifier $\tau_{RA}$ and the seed pulse separation period $\tau_{osc}$, newly injected pulses to the regenerative amplifier add up before or after the pulse or pulses, already circulating in the cavity.

In this way, a train of laser pulses within the regenerative amplifier is formed. The time separation between the pulses in this train $\Delta\tau$ is then $$\Delta\tau = |\tau_{osc} - N\tau_{RA}|.$$

Here N is integer number, greater or equal to 1, and such, as to ensure $\Delta\tau < \tau_{RA}$.

In the case of round-trip time in the regenerative amplifier $\tau_{RA}$ and the seed pulse separation period $\tau_{osc}$ being similar (i.e. separated by less than 1 nanosecond), N=1 and time interval between successive pulses in the circulating pulse train in the regenerative amplifier is $$\Delta\tau = |\tau_{osc} - \tau_{RA}|.$$

Locking of the regenerative amplifier and amplification of pulses is achieved by setting electro-optic system of the regenerative amplifier to the state, which does not cause any change of polarization of the laser pulse, passing the branch of the regenerative amplifier containing the electro-optic system and any additional pulse polarization-changing elements twice. This is equivalent to setting voltage of the Pockels cell to the λ/2 voltage if the Pockels cell is the only pulse polarization-affecting element in this branch, or λ/4 voltage, if the branch additionally contains quarter-waveplate.

In such operational mode, any seed pulse, supplied to the regenerative amplifier, exits the cavity after two passes in the branch, containing polarization-affecting elements, without amplification. While the regenerative amplifier is locked from the pulse supply by the master oscillator, pulses, injected into the regenerative amplifier during the injection stage, keep circulating and are further amplified.

Pulse ejection from the regenerative amplifier is achieved by setting electro-optic system of the regenerative amplifier to some intermediate state, which causes laser pulses within the regenerative amplifier being only partially transmitted through the polarization-selective optical elements at each round-trip. As a result, a part of pulse energy is left for circulation and further amplification within the regenerative amplifier, while the rest part is ejected from the regenerative amplifier as laser pulse bursts, the in-burst frequency f of which is equal to the inverse of time separation between pulses, being circulated within the regenerative amplifier. I.e., $$\Delta f = \frac{1}{|\tau_{osc} - N\tau_{RA}|}.$$

In contrast to the laser burst methods, known from the prior-art, in this embodiment the laser in-burst frequency is related to the relative times of the round-trip in the regenerative amplifier and seed pulse separation, respectively, instead of fixed repetition rate of the master oscillator. One of ordinary skills in the art would recognize, that by adjustment of geometric parameters, e.g. cavity length, of the regenerative amplifier and/or seed oscillator, value of $\Delta\tau$ can be tuned to shorter than a nanosecond, thus providing $f_{n-burst}$ in range from a few to a few tens of GHz.

DRAWINGS

Figure 2B:
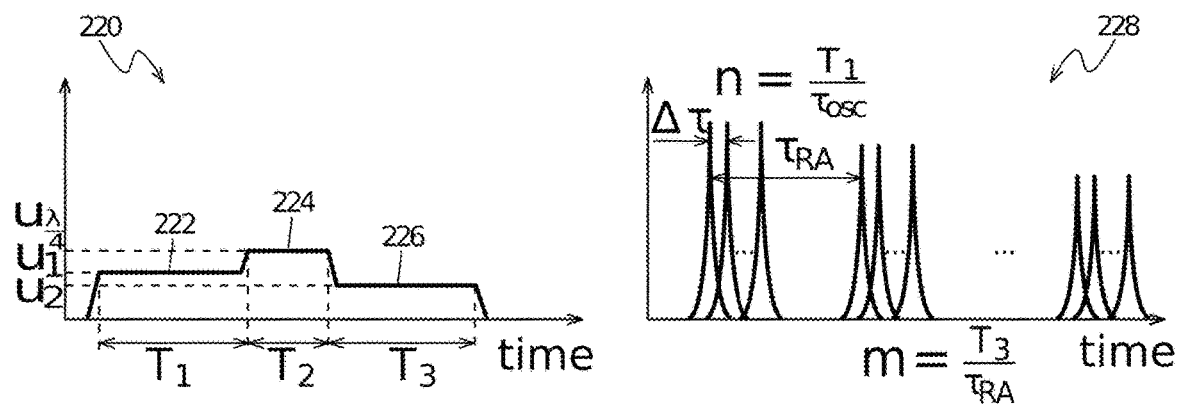
Figure 3A:
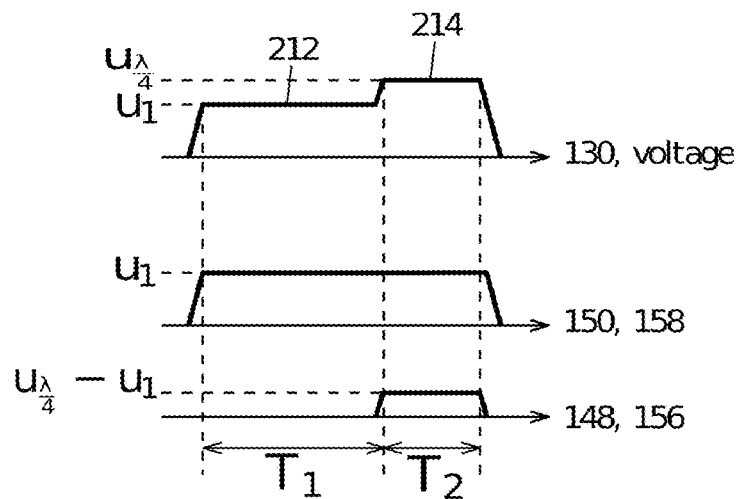
Figure 3B:
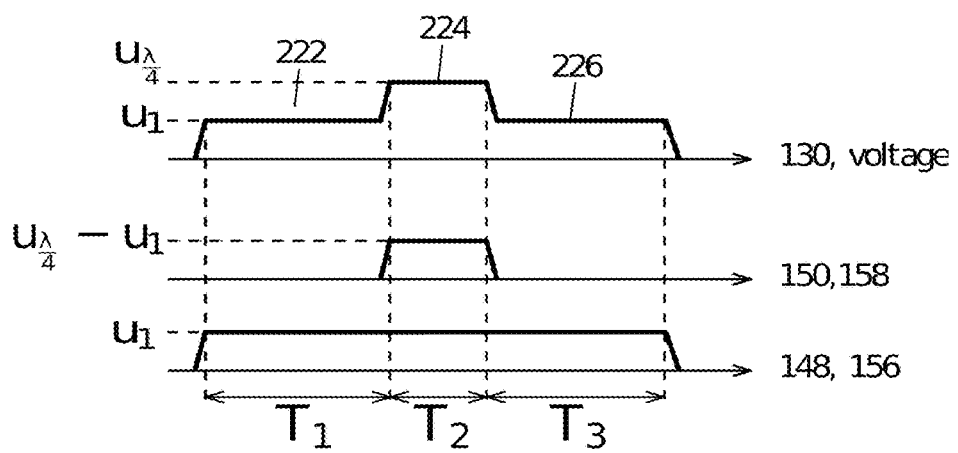
Figure 3C:
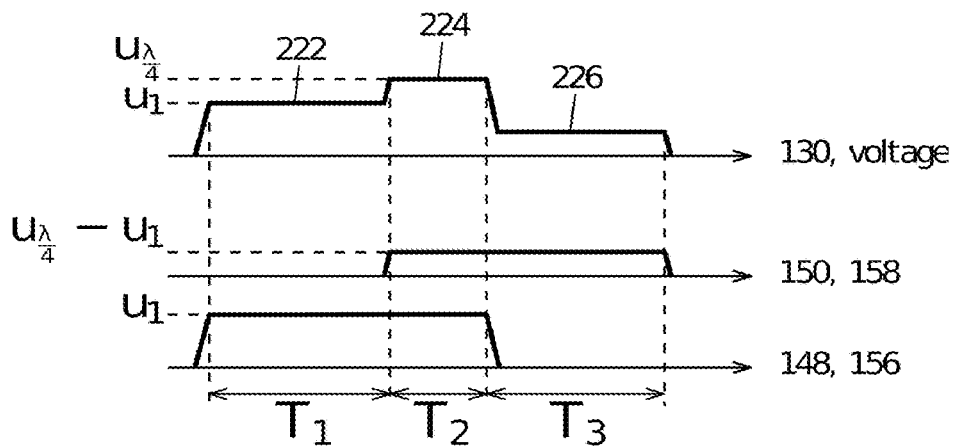
Figure 4A:
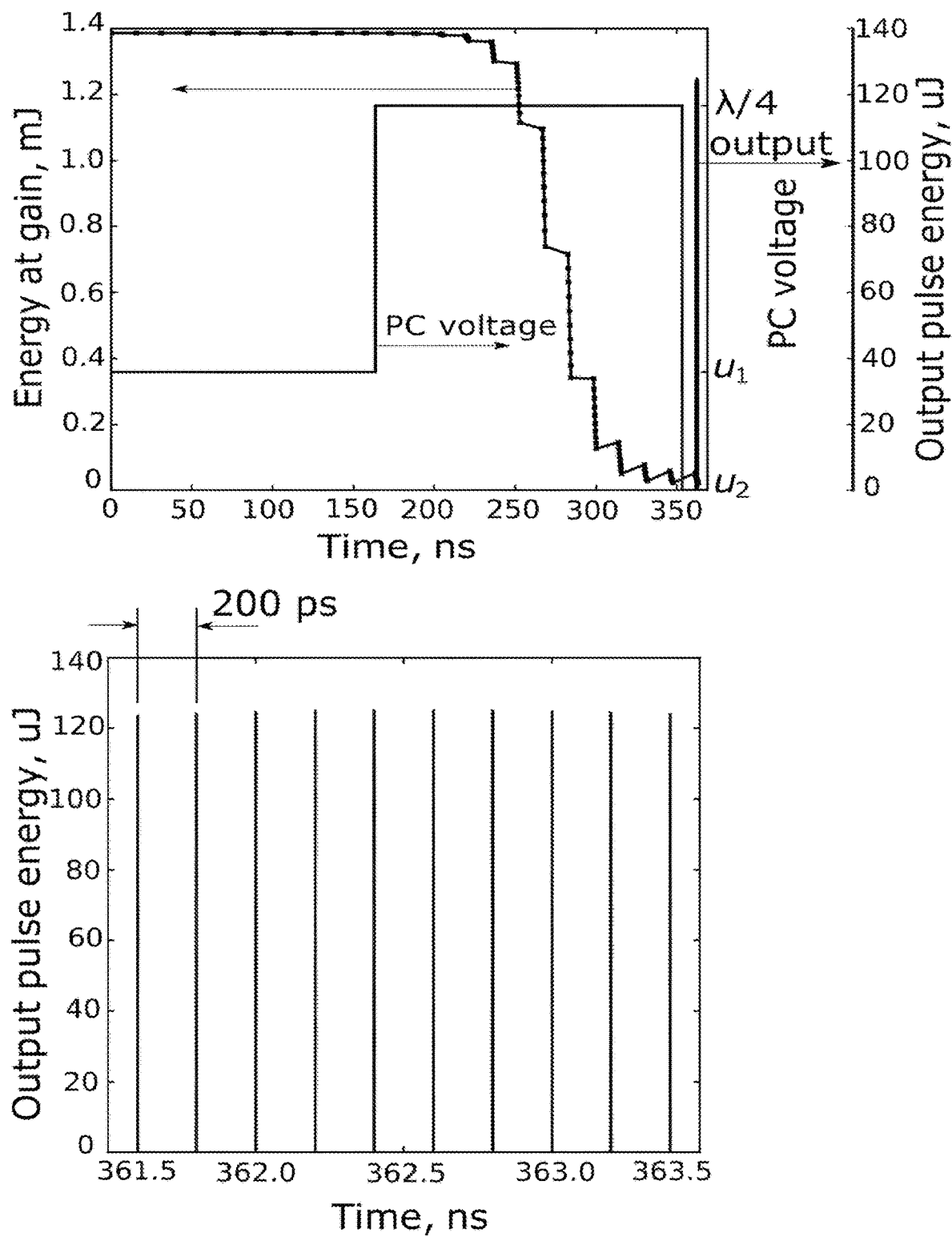
Figure 4B:
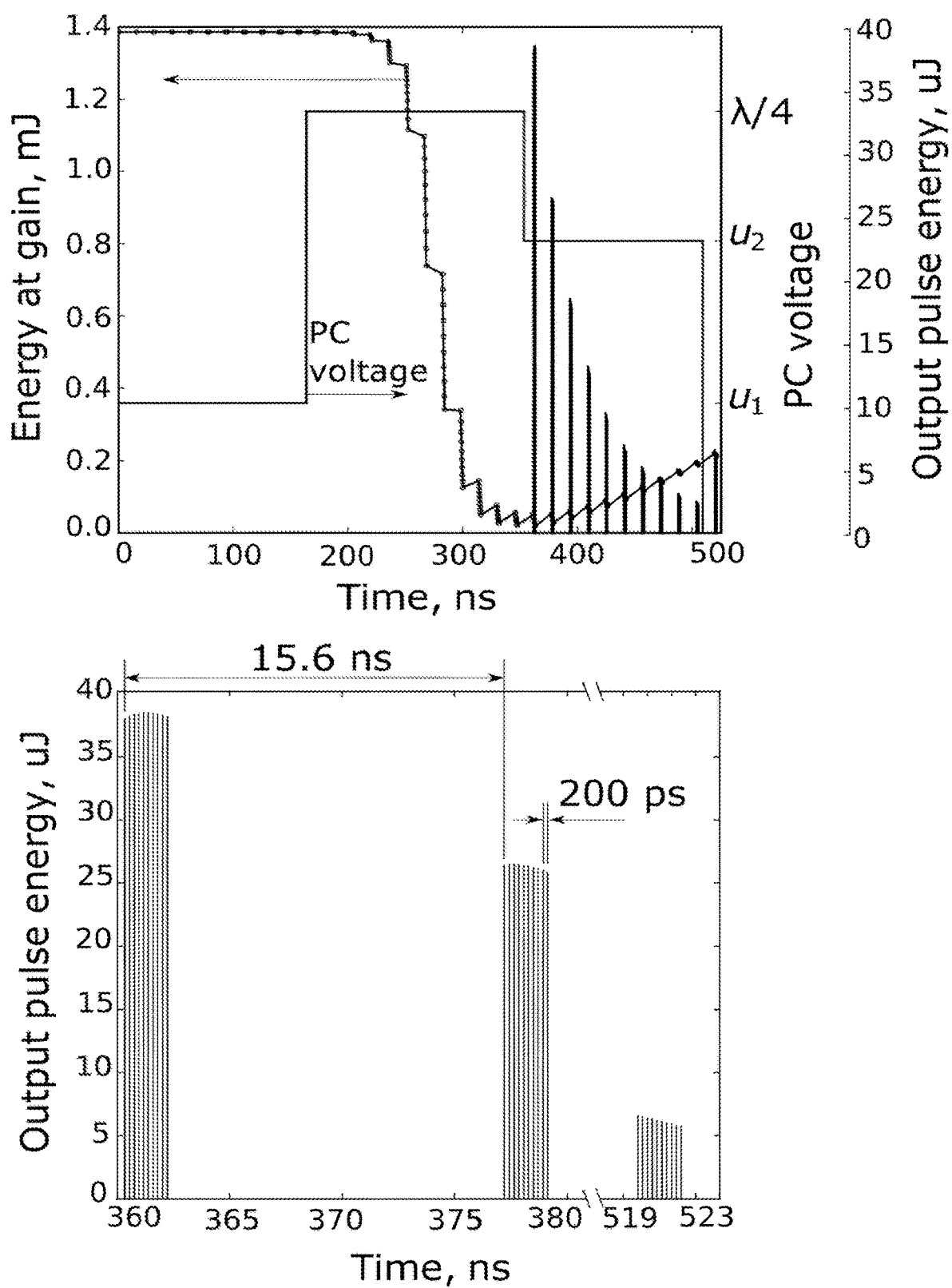
Figure 5:
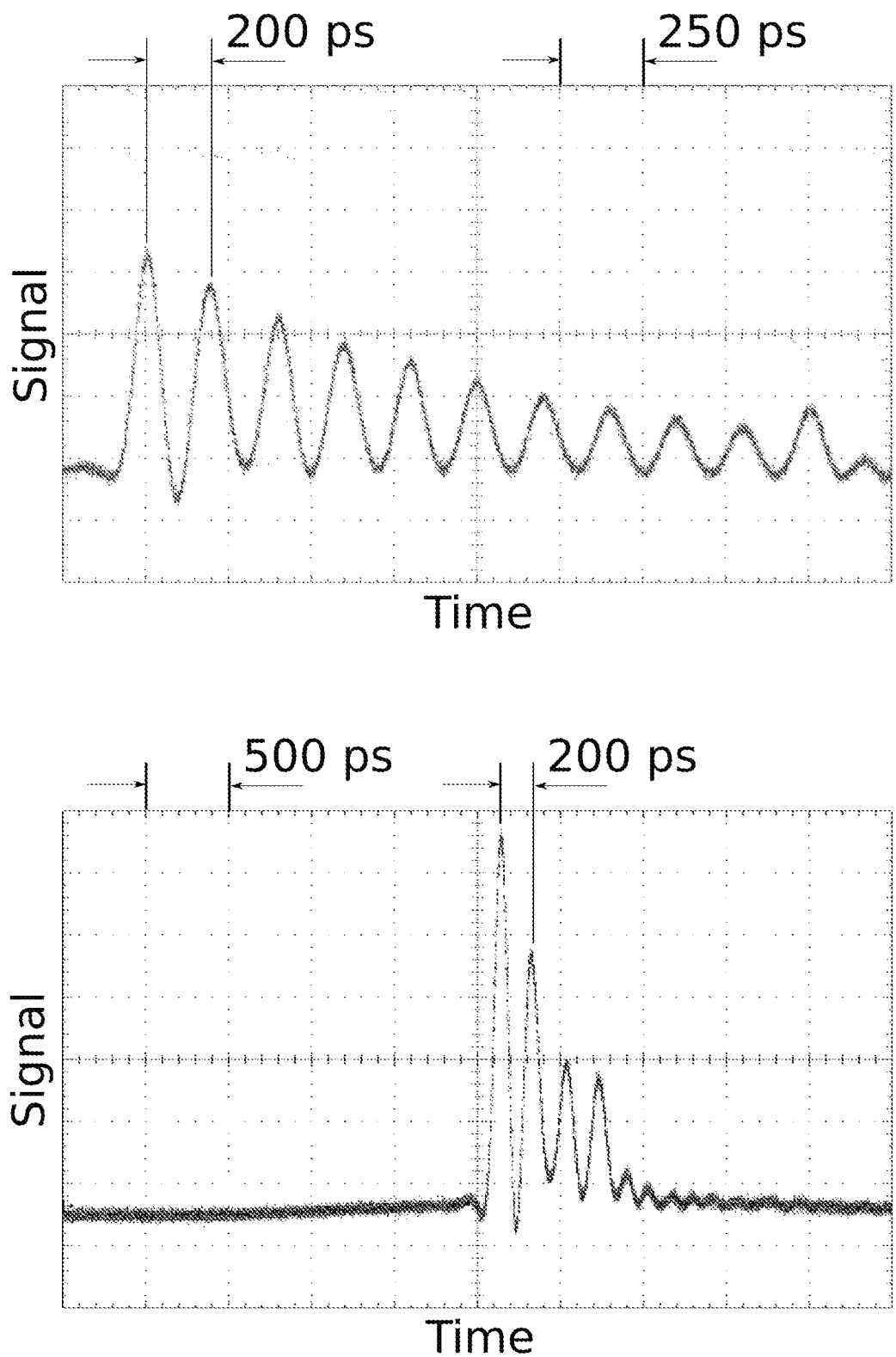

FIGS. 1a-d illustrate the schematics of the laser system, comprising the regenerative amplifier according to the given embodiment;

FIGS. 2a-b illustrate the procedures of injection, locking/amplification and ejection according to the given embodiment by switching sequence of the polarization-switching device;

FIGS. 3a-c illustrate the methods for switching Pockels cells as time dependencies of voltages, supplied by the corresponding high-voltage drivers;

FIGS. 4a-b show calculated results of examplary operation of the electro-optic system for laser burst generation;

FIG. 5 show measured optical signal of examplary operation of the electro-optic system for laser burst generation;

DRAWINGS—REFERENCE NUMERALS 110 laser system
112 master oscillator
114 polarizing beam splitter
116 half-waveplate
118 Faraday isolator
120 mirror
122 mirror
124 first branch
126 second branch
128 polarizing beam splitter
130 polarization-switching device
132 gain medium
134 output
136 quarter-waveplate
138 electro-optical unit
140 control element
142 quarter-waveplate
144 electro-optical unit
146 electro-optical unit
148 control element
150 control element
152 quarter-waveplate
154 dual-crystal Pockels cell
156 control element
158 control element
210 voltage time dependence
212 first time interval, corresponding to injection of n pulses
214 second time interval, corresponding to amplification of 1 burst
216 operation stage, corresponding to ejection of 1 burst
218 ejected pulse time dependence
220 voltage time dependence
222 first time interval, corresponding to injection of n pulses
224 second time interval, corresponding to amplification of 1 burst
226 third time interval, corresponding to ejection of m bursts
228 ejected pulse time dependence

DETAILED DESCRIPTION

Herein and further we will use terms like 'master oscillator', which means a mode-locked short-pulse laser having a fixed pulse repetition rate, typically in the tens of MHz range. Except if the oscillator comprises means for actively changing the length of the the optical cavity.

The term 'RA' means a regenerative amplifier.

'Seed pulses' means multiple pulses emitted by the master oscillator, where temporal distance is in the range of nanoseconds (e.g. for a 80 MHz pulse repetition rate master oscillator); 'seed burst' means a collection or a burst of injected seed pulses, these pulses might be injected in a regenerative amplifier cavity but not yet amplified, the temporal distance between pulses of a seed burst is in the range of picoseconds, as the pulses might be injected into the regenerative amplifier and added to an already circulating seed burst on different round-trips of a burst inside the RA cavity.

The term 'PC' means a Pockels cell.

Single burst—is a burst of pulses, which are amplified from a seed burst.

Multiple burst—collection of single bursts, ejected one after other on different round-trips of an amplified burst inside the cavity of the RA.

Description—FIG. 1a-d

FIGS. 1a-d illustrate the schematics of an embodiment of a laser system 110, comprising a seed pulse generator or a master oscillator 112, a first polarization-selective element 114, e.g. a first polarizing beam splitter, a first polarizing element 116, e.g. a half-waveplate, a polarization rotator 118, e.g. a Faraday isolator, and a regenerative amplifier cavity confined between at least two reflective elements, e.g. mirrors 120 and 122; the regenerative amplifier cavity further comprises at least two branches 124 and 126, separated by a second polarization-selective element 128, e.g. a second polarizing beam splitter; the first branch 124 further comprises mirror 120 and polarization-switching device 130; the second branch 126 further comprises mirror 122 and a gain medium 132.

Gain medium 132 e.g. may be embodied as a ytterbium- or neodymium-doped laser medium (e.g. Yb:KYW, Yb:KGW or Nd:YVO4). These materials are provided as examples only. The selection of gain medium, should not limit the scope of this invention.

The polarization-switching device 130 comprises at least one electro-optical unit, preferably a Pockels cell, and a corresponding voltage driving circuit and might comprise one or more polarizing elements, such as a quarter-waveplate or a half-waveplate.

Possible embodiments of the electro-optical device are shown in FIGS. 1b-d.

FIG. 1b shows an implementation of the polarization-switching device, which is known from the prior art. It comprises a quarter-waveplate 136 and an electro-optical unit 138, e.g. a Pockels cell, and its control element, driver 140. The Pockels cell might be a standard commercially available electro-optical component, while the driver is not standard electronics component and its working principles are known from the prior-art (U.S. Pat. No. 9,531,151).

FIG. 1c shows a possible embodiment of the polarization-switching device, which is applicable to the current invention. It comprises a quarter-waveplate 142 and two electro-optical units 144 and 146, e.g. Pockels cells, and their control elements 148 and 150. In this embodiment, the Pockels cells might be a standard commercially available electro-optical component and the corresponding drivers might be standard commercially available high-voltage switches.

FIG. 1d shows an alternative embodiment of the polarization-switching device, which is applicable to the current invention. It comprises a quarter-waveplate 152, dual-crystal Pockels cell 154, and two control elements 156 and 158. In this embodiment, the Pockels cells is a non-standard electro-optical element, comprising two non-linear crystals, the voltage to which can be supplied separately. Alternatively, there might be a single non-linear crystal with appropriate contacts (typically 4 contacts) to connect two high voltage switches. The corresponding control elements used in this arrangement might be standard commercially available high-voltage switches.

In any of these embodiments, the optical switch can be any electro-optical device capable of changing polarization and/or phase of transmitted light and the locking voltage of the optical switch corresponds to a gate voltage of the electro-optical device, in particular a λ/4 voltage or zero voltage.

Operation—FIGS. 1a-d

For the sake of simplicity, herein and further, the polarization of the input seed pulse will be referred to as "p-polarized"; and the polarization, which is perpendicular to the seed pulse polarization, will be referred to as "s-polarization". One skilled in the art would recognize, that operational principles of this and other embodiments are irrelevant to the assumed polarization state of the seed pulse polarization.

The first polarizing beam splitter 114, which is arranged between the master oscillator 112 and the quarter-waveplate 116, is oriented so that it would transmit the p-polarized seed pulses arriving from the side of the master oscillator 112 and would reflect the s-polarized pulses arriving from the opposite side to an output 134.

The laser pulse further goes through the half-waveplate 116 and the Faraday isolator 118, which causes polarization state of the pulse to be switched to s-polarized. The second polarizing beam splitter 128, which is oriented so that it would transmit the s-polarized light, further transmits the pulse into the first branch 124 of the resonator cavity.

In the first branch, pulse goes through the polarization-switching device 130, reflects off the mirror 120, and goes through the polarization-switching device for the second time before arriving at the second polarizing beam splitter 128. As this polarizing beam splitter is oriented to transmit s-polarized pulses towards the first polarizing beam splitter 114 and reflect the p-polarized pulses to the second branch 126 of the regenerative amplifier cavity, transmittance/reflectance of the pulse at this point is fully defined by the operating mode of the polarization-switching device 130.

When the polarization-switching device 130 operates in a mode, which changes the linear polarization (i.e. p-polarization or s-polarization) of the pulse to circular polarization (i.e. operates as a single quarter-waveplate), double-pass through this element causes switching polarization of the pulse from s-polarized to p-polarized. In this case, pulse is reflected from the second beam splitter and directed to the second branch 126 of the regenerative amplifier cavity. During the double-pass in this branch, pulse is amplified in the gain medium 132 twice and then is reflected again in the polarizing beam splitter 128 to the first branch. There the polarization state of pulse is again switched back to p-polarization. Pulse is then transmitted through the polarizing beam splitter. Its polarization is subsequently switched to s-polarization in the Faraday isolator 118 and the half-waveplate 116. Finally, pulse is exctracted from the laser system after reflecting off the first polarizing beam splitter 114. Since every pulse is amplified only twice before ejection, this operation mode is denoted as inactive.

When the polarization-switching device 130 operates in a mode, which switches the polarization state of pulse from p-polarization to s-polarization (i.e. operates as a single half-waveplate), passing through this element twice causes no change of polarization of the pulse. Then, if s-polarized seed pulse is injected into the first branch 124, it is later transmitted through the second polarizing beam splitter 128 without amplification. With respect to the seed pulse, regenerative amplifier operates in inactive mode. However, if the pulse arrives from the second branch 126, i.e. is p-polarized, it is never transmitted through the second polarizing beam splitter 128 and is locked within the regenerative amplifier cavity. Therefore, this operation mode is denoted as locked.

When the polarization-switching device 130 operates in a mode, which switches the polarization state of pulse to an intermediate state, both reflection and refraction of pulses of arbitrary polarization at the second polarizing beam splitter 128 occurs. That is, part of the pulse is locked within the cavity and part is exctracted from it at each round-trip. At the same time, part of any incoming seed pulse is also injected into the regenerative amplifier cavity. This operation mode is denoted as intermediate, wherein the electro-optical unit is provided with an intermediate switching voltage.

In other words, injection step involves application of a first intermediate voltage to polarization-switching device for a time span, during which one or more pulses from the master oscillator are injected into the regenerative amplifier, thus forming a burst of injected seed pulses—a seed burst. This seed burst is further amplified in the amplification step, in which the polarization-switching device voltage is set to a locking voltage.

Yet in another embodiment, the pulses from the master oscilator have a repetition rate in the range of tens of MHz and only certain pulses are picked by an additional electro-optical pulse picking device and injected into the RA cavity at appropriate moments in time in order to build a seed burst with desired temporal pattern.

Description—FIGS. 2a-b

FIGS. 2a-b show the behaviour of a laser system according to the embodiment on injection, amplification and ejection of an arbitrary number of laser bursts with an arbitrary number of pulses in a single burst.

Operation—FIGS. 2a-b

In FIG. 2a, method of producing a single laser pulse burst is illustrated. On the left, a time dependence of the voltage 210, applied to the electro-optical unit 130 of given embodiment, is shown. During the first time interval 212 of duration $T_1$, the polarization-switching device 130, is set to the intermediate operating mode, by applying the first intermediate switching voltage, and $n=T_1/\tau_{osc}$ laser pulses are injected into the regenerative amplifier cavity. During the second time interval 214 of duration $T_2$, the polarization-switching device is set to the locked mode and amplification of previously injected pulses takes place. Time distance between the successive pulses within the cavity is $$\Delta\tau=|\tau_{osc}-N\tau_{RA}|.$$

Here N is an integer number, greater or equal to 1, and such, as to ensure $\Delta\tau<\tau_{RA}$. Finally, the driving voltage is turned off and the polarization-switching unit is switched to the inactive mode; this stage of operation 216 corresponds to ejection of a single burst of n pulses. The in-burst frequency of the burst is $f=1/\Delta\tau$, is produced, as shown in FIG. 2a, ejected pulse time dependence 218 on the right.

In FIG. 2b, a method of producing multiple laser pulse bursts or a multiple burst is illustrated. On the left, a time dependence of the voltage 220, applied to the electro-optic unit of given embodiment, is shown. During the first time interval 222 of duration $T_1$, the polarization-switching device 130 is set to the intermediate operating mode, by applying the first intermediate switching voltage, and $n=T_1/\tau_{osc}$ laser pulses are injected into the regenerative amplifier cavity. During the second time interval 224 of duration $T_2$, the polarization-switching device 130 is set to the locked mode, by applying a locking voltage, and amplification of previously injected pulses occurs. Time distance between the successive pulses within the cavity is $$\Delta\tau=|\tau_{osc}-N\tau_{RA}|.$$

Here N is an integer number, greater or equal to 1, and such, as to ensure $\Delta\tau<\tau_{RA}$. During the third time interval 226 of duration $T_3$, the polarization-switching device 130 is set to the second intermediate mode, by applying the second intermediate voltage, which results in partial ejection of amplified laser bursts on each round-trip in the RA cavity, thus a multiple burst is formed. The number of produced bursts m is defined as $m=T_3/\tau_{RA}$; the bursts are separated by $\tau_{RA}$ and the in-burst frequency is $f=1/\Delta\tau$, as shown in FIG. 2b, ejected pulse time dependence 228 on the right.

In other words, in one of the embodiments, the ejection step comprises setting the polarization-switching device to a second intermediate voltage, at which the optical switch allows partial ejection of the amplified pulse burst on each round-trip of the pulse burst in the cavity of the regenerative amplifier, thus creating a multiple burst.

Description—FIG. 3a-c

FIGS. 3a-c illustrate time dependencies of voltages, supplied by the corresponding high-voltage drivers.

In FIG. 3a, time dependence of total voltage, supplied to the whole polarization-switching device 130, is shown in the first row. In the second and third rows, time dependencies of voltages, supplied by first and second control elements (fast high-voltage switches) 148 and 150 in an embodiment, shown in FIG. 1c, are shown. For an alternative embodiment, shown in FIG. 1d, the corresponding high-voltage switches are 156 and 158.

In FIGS. 3b-c, alternative time dependencies of supplied voltages are illustrated.

Operation—FIG. 3a-c

Pockels cell switching time-dependence, detailed in FIG. 3a, corresponds to the operational mode of single burst generation, disclosed previously and schematically illustrated in FIG. 2a.

Pockels cell switching time-dependencies, detailed in FIGS. 3b and 3c, correspond to alternative methods of multiple burst generation, disclosed previously and schematically illustrated in FIG. 2b.

In the case of switching mode (intermediate switching voltages), shown in FIG. 3b, and the state of the polarization-switching unit 130 during the injection stage 222 and ejection stage 226 are equal and correspond to voltage $u_1$, provided by one of active control elements (fast high voltage switches).

In the case of switching mode, shown in FIG. 3c, state of the polarization-switching device 130 during the injection stage 222 and ejection stage 226 are different; state during the injection stage 222 corresponds to voltage $u_1$, provided by one of active drivers, state during the ejection stage 226 corresponds to voltage $u_2$, which is equal to the difference between the $\lambda/4$ voltage and $u_1$.

Description—FIG. 4a-b

FIGS. 4a-b show calculated results of examplary operation of the electro-optic system for laser burst generation.

In FIG. 4a, time dependencies of voltage, applied to the polarization switching device 130, i.e. PC voltage, energy at gain medium 132, and pulse energy at output 134 are shown on the left, illustrating scheme of a single gigahertz burst of laser pulses generation according to scheme, shown in FIG. 2a. On the right, zoomed-in region of time dependency is shown, with laser pulses in a single burst.

In FIG. 4b presentation is analogous to FIG. 4a, illustrating scheme of generation of multiple gigahertz bursts, according to scheme, shown in FIG. 2b.

Operation—FIG. 4a-b

Time dependencies of laser pulse burst output, shown in FIG. 4a-b, were obtained by theoretically simulating seed pulse amplification in the laser system 110. Seed pulses, generated by the master oscillator 112, were assumed to be of 75.0 nJ energy each and their multiple interactions with the gain medium 132 and other optical elements, causing losses, were calculated. At each round-trip at the regenerative amplifier, energy amplification of each pulse at the gain medium was simulated with the Frantz—Nodvik equation, $$E_{out} = E_{sat} \ln\left\{1 + \exp\left(\frac{E_{st}}{E_{sat}}\right)\left[\exp\left(\frac{E_{in}}{E_{sat}}\right) - 1\right]\right\}.$$

Here $E_{sat}$ is the gain medium saturation energy, set to 2 μJ, $E_{in}$ is the energy of the incoming pulse and $E_{st}$ is the energy, stored at gain, being depleted at each interaction as $$E_{st}(t) = E_{st}(0)\exp\left(\frac{-t}{\tau}\right) + \ln G_0 E_{sat}\left[1 - \exp\left(\frac{-t}{\tau}\right)\right],$$

where t is the time between successive interactions, T is the fluorescence lifetime of the gain medium, set to 500 ns, $G_0$ is gain, set to 2.

Injection, amplification and ejection of pulses in the regenerative amplifier is achieved by operation of the polarization-switching device 130 and the polarizing beam splitter 128. Here, the operation of these elements was simulated by assuming time-dependent transmission coefficients at the polarizing beam splitter 128, corresponding to PC voltages $u_1$, $u_2$ and $u_{λ/4}$. Additional losses of 5%, caused by passive optical elements were included at each round-trip in the regenerative amplifier.

Generation of seed pulses and their propagation in the regenerative amplifier were simulated by assuming optical path in the master oscillator, equal to time separation between the successive seed pulses, $\tau_{osc}$=15.6 ns, and round-trip time in the regenerative amplifier $\tau_{RA}$=15.8 ns. With such scheme, laser pulse bursts with pulses, separated by 200 ps, corresponding to the in-burst frequency of 5 GHz, are generated.

Description—FIG. 5

FIG. 5 show measured optical signal of the electro-optic system for laser burst generation.

On the left, an optical output of a single burst consisting of 11 femtosecond pulses is illustrated. On the right, an optical output of a single burst consisting of 4 femtosecond pulses is illustrated.

Operation—FIG. 5

Spectrograms in FIG. 5 were obtained by focusing optical output of the electro-optic system to a fast photodiode and the electric signal was measured with an oscilloscope.

Yet in another embodiment, the time gap between amplified laser pulses in a single burst might be tuned by adjusting the round-trip time of an injected pulse in the regenerative amplifier and/or time gap between seed pulses of the master oscillator. This can be done by changing the cavity length of the RA and/or the master oscillator either manually or actively (computer controlled). For example, in the RA, this can be accomplished by adjusting optical paths in at least one branch of the regenerative amplifier.

Yet in another embodiment, the amplitude envelope of pulses in a single burst is controlled by changing the amplitude of the first intermediate voltage. Additionally, a slope of the first intermediate voltage, in other words a gradual voltage increase/decrease during time $T_1$, might be used to shape the amplitude envelope of pulses in a single burst.

Yet in another embodiment, the amplitude envelope of multiple bursts is controlled by changing the amplitude of the second intermediate voltage. Additionally, a slope of the second intermediate voltage, in other words a gradual voltage increase/decrease during time $T_3$, might be used to shape the amplitude envelope of pulse bursts in a multiple burst.

Such laser device as described above can be installed into laser systems dedicated for precission material processing, medical therapy, or time resolved spectroscopy.

REFFERENCES

Bergmann et al. 2010. Controlling Pockels cells. U.S. Pat. No. 7,649,667.

Courjaud. 2016. System and method for generating a burst of ultra-short, high-power laser pulses. U.S. Pat. No. 9,525,264.

Danielius, Romualdas. 2016. Regenerative optical amplifier for short pulsed lasers, a laser source and a laser workstation. U.S. Pat. No. 9,306,370.

Deladurantaye et al. 2004. Laser device. U.S. Pat. No. 6,807,198.

Deladurantaye, P., A. Cournoyer, M. Drolet, L. Desbiens, D. Lemieux, M. Briand, and Y. Taillon. 2011. "Material micromachining using bursts of high repetition rate picosecond pulses from a fiber laser source." *Proceedings of SPIE* 784104, Fiber Lasers VIII: Technology, Systems, and Applications.

Forrester, P., K. Bol, L. Lilge, and R. Marjoribanksa. 2006. "Effects of heat transfer and energy absorption in the ablation of biological tissues by pulsetrain-burst (>100 MHz) ultrafast laser processing." *Proceedings of SPIE* 6343, Photonics North 2006.

Fuchs et al. 2016. Method for generating a burst mode by means of switching a Pockels cell. U.S. Pat. No. 9,531,151.

Grishin et al. 2011. Multiple output repetitively pulsed laser. U.S. Pat. No. 7,970,026.

Herman et al. 2003. Burst-ultrafast laser machining method. U.S. Pat. No. 6,552,301.

Hosseini et al. 2015. Generation of burst of laser pulses. Patent EP2250714.

Hu, Wenqian, Yung C. Shin, and Galen King. 2010. "Modeling of multi-burst mode pico-second laser ablation for improved material removal rate." *Applied Physics A. Materials Science & Processing* 98, 407-415.

Kafka et al. 2004. Low-gain regenerative amplifier system. U.S. Pat. No. 7,016,107.

Kerse, C., H. Kalaycioğu, P. Elahi, B. Çetin, D. K. Kesim, Ö. Akçaalan, S. Yavaş, et al. 2016. "Ablation-cooled material removal with ultrafast bursts of pulses." *Nature* 537, 84-89.

Klimov et al. 2008. Light pulse generating apparatus and method. U.S. Pat. No. 7,386,019.

Neuenschwander, B., Th. Kramer, B. Lauer, and B. Jaeggi. 2015. "Burst mode with ps- and fs-pulses: Influence on the removal rate, surface quality and heat accumulation." *Proceedings of SPIE* 9350, Laser Applications in Microelectronic and Optoelectronic Manufacturing (LAMOM) XX, 93500U.

Noh et al. 2016. Pulse laser device and burst mode using same, and method for controlling a variable burst mode. U.S. Pat. No. 9,461,436.

Qian, Z., A. Mordovanakis, J. E. Schoenly, A. Covarrubias, Y. Feng, L. Lilge, and R. S. Marjoribanks. 2014. "Pulse-train-burst mode, ultrafast-laser interactions with 3D viable cell cultures as a model for soft biological tissues." *Biomedical Optics Express* 5, 208-222.

Rezaei, S., J. Li, and P. R. Herman. 2015. "Burst train generator of high energy femtosecond laser pulses for driving heat accumulation effect during micromachining." *Optics Letters* 40, 2064-2067.

Rockwell et al. 2016. Method and apparatus for temporally concentrating pump power to support generation of high peak-power pulse bursts or other time-varying laser output waveforms. U.S. Pat. No. 9,246,303.

Tamaki et al. 2005. Regenerative optical amplifier. U.S. Pat. No. 6,882,469.

Zhang, Haibin, Shane M. Eaton, and P. R. Herman. 2007. "Single-step writing of Bragg grating waveguides in fused silica with an externally modulated femtosecond fiber laser." *Optics Letters* 32, 2559-2561.

Zimmermann, F, S. Richter, S. Döring, A Tünnermann, and S Nolte. 2013. "Ultrastable bonding of glass with femtosecond laser bursts." *Applied Optics* 52, 1

The invention claimed is:

1. A method for generating a series of laser pulses in a laser device, comprising at least a master oscillator and a regenerative amplifier comprising an optical switch, the method comprising at least steps of
    injecting a laser seed pulses from the master oscillator into the regenerative amplifier,
    amplifying the injected seed pulses during multiple round-trips in an optical cavity of the regenerative amplifier, and
    ejecting the amplified seed pulses from the optical cavity of the regenerative amplifier; and
    wherein the injection step involves application of a first intermediate voltage directly onto the electrodes of the optical switch;
    wherein the first intermediate voltage is adjustable in a range between a locking voltage in which the seed pulses are locked in the regenerative amplifier for an amplification step and an open state in which the seed pulses can be injected into the regenerative amplifier and amplified pulses can be ejected without losses;
    wherein the first intermediate voltage is created for a time span, during which the regenerative amplifier is in a partially opened state so that more than one of the seed pulses from the master oscillator are injected into, circulated within, and ejected from the cavity of the regenerative amplifier simultaneously with their partial intensity, thus forming a burst of injected seed pulses;
    wherein the seed pulses in said seed burst are spaced by a time gap less than the time gap ($\tau_{OSC}$) between seed pulses arriving from the master oscillator.

2. The method of claim 1, wherein the ejection step comprises setting the optical switch to a second intermediate voltage, at which the optical switch allows partial ejection of the amplified seed burst on each round-trip within the cavity of the regenerative amplifier, thus creating a multiple burst ejected from the regenerative amplifier.

3. The method of claim 1, wherein the amplified pulses are spaced apart in a single burst by a time gap of less than the absolute value of the minimum difference between at least one round-trip time of the pulse in the optical cavity of the regenerative amplifier and time gap between seed pulses, generated by the master oscillator.

4. The method of claim 1, wherein the first intermediate voltage used in the injection step is created by a first high-voltage switch.

5. The method of claim 1, wherein the second intermediate voltage used in the amplified seed burst ejection step is created by the first or a second high-voltage switch.

6. The method according to claim 5, wherein the locking voltage used in the amplification step is created by activating or deactivating both the first and the second high-voltage switches.

7. The method of claim 1, wherein the amplitude envelope of pulses in a single burst is controlled by changing the amplitude or the slope of the first intermediate voltage.

8. The method of claim 2, wherein the amplitude envelope of multiple bursts is controlled by changing the amplitude or the slope of the second intermediate voltage.

9. The method of claim 1, wherein the injection step involves control of duration of the first intermediate voltage, which determines the number of seed pulses being injected into the regenerative amplifier and thus the number of pulses in a single burst.

10. The method of claim 1, wherein the ejection step involves control of duration of the second intermediate voltage, which determines the number of amplified bursts being ejected from the regenerative amplifier and thus the number of bursts in a multiple burst.

11. A laser device comprising at least a master oscillator and a regenerative amplifier, the regenerative amplifier comprising an optical switch, which is arranged to be switched at least to a locking state in which more than one of the seed pulses are locked in the regenerative amplifier for an amplification step;
    wherein the optical switch is arranged to be switched by a first high-voltage switch with a first intermediate voltage into a state, in which the optical switch is partially transmissive and allows more than one of seed pulses to pass into and circulate within a cavity of the regenerative amplifier thereby forming a seed burst; and
    wherein a second high-voltage switch with the locking voltage, corresponding to the locking state of said optical switch and the locked state of said regenerative amplifier; and
    wherein the optical switch is further arranged to be switched to a second intermediate state in which the optical switch is partially or completely transmissive and allows ejection of a single or multiple amplified seed bursts from the cavity of the regenerative amplifier; and
    wherein the first intermediate voltage is adjustable in a range between the locking voltage for which the seed pulses are locked in the regenerative amplifier for an amplification step and an open state in which the seed pulses can be injected into the regenerative amplifier and amplified pulses can be ejected without losses.

12. The laser device of claim 11, wherein the optical switch is a Pockels cell, which comprises one or two separate individually controlled electro-optical units.

13. The laser device of claim 12, wherein the Pockels cell comprises one optical part and two individually controlled high voltage switching electronics units.

14. The laser device of claim 12, wherein the Pockels cell comprises two optical parts and two separate individually controlled high voltage switching electronics units.

15. The laser device of claim 11, wherein the optical switch is arranged to control the amplitude envelope of pulses in a single burst through control of the amplitude or the slope of the first intermediate voltage.

16. The laser device of claim 11, wherein the optical switch is arranged to control the amplitude envelope of multiple bursts through control of the amplitude or the slope of the second intermediate voltage.

17. The laser device of claim 11, wherein the optical switch is arranged to control the number of seed pulses being injected into the regenerative amplifier and thus the number of pulses in a single burst through control of duration of the first intermediate voltage.

18. The laser device of claim 11, wherein the optical switch is arranged to control the number of amplified bursts being ejected from the regenerative amplifier in a multiple burst through control of duration of the second intermediate voltage.

19. The method of claim 2, wherein the amplified seed pulses are spaced apart in a single burst by a time gap of less than the absolute value of the minimum difference between at least one round-trip time of the pulse in the optical cavity of the regenerative amplifier and time gap between seed pulses, generated by the master oscillator.

* * * * *